United States Patent
Takahashi et al.

(10) Patent No.: US 8,429,152 B2
(45) Date of Patent: Apr. 23, 2013

(54) TERMINAL DEVICE, CONTENT DISPLAYING METHOD, AND CONTENT DISPLAYING PROGRAM

(75) Inventors: Noboru Takahashi, Tokyo (JP); Koji Matsuzawa, Ayase (JP); Satoshi Aida, Tokyo (JP)

(73) Assignee: Access Co., Ltd., Tokyo (JP)

( * ) Notice: Subject to any disclaimer, the term of this patent is extended or adjusted under 35 U.S.C. 154(b) by 876 days.

(21) Appl. No.: 12/375,523

(22) PCT Filed: Jul. 23, 2007

(86) PCT No.: PCT/JP2007/064404
§ 371 (c)(1),
(2), (4) Date: Aug. 17, 2009

(87) PCT Pub. No.: WO2008/013128
PCT Pub. Date: Jan. 31, 2008

(65) Prior Publication Data
US 2009/0305685 A1    Dec. 10, 2009

(30) Foreign Application Priority Data
Jul. 28, 2006    (JP) ................................. 2006-206411

(51) Int. Cl.
G06F 17/30    (2006.01)
(52) U.S. Cl.
USPC ........................................................ 707/722
(58) Field of Classification Search .............. 707/722, 707/726, 772, 634; 709/202; 715/271, 731, 715/760
See application file for complete search history.

(56) References Cited

U.S. PATENT DOCUMENTS

| | | | |
|---|---|---|---|
| 6,857,102 B1 | 2/2005 | Bickmore et al. | |
| 2003/0058277 A1* | 3/2003 | Bowman-Amuah | 345/765 |
| 2007/0156677 A1* | 7/2007 | Szabo | 707/5 |
| 2008/0177994 A1* | 7/2008 | Mayer | 713/2 |

FOREIGN PATENT DOCUMENTS

| | | |
|---|---|---|
| JP | 10-49531 A | 2/1998 |
| JP | 2000-076473 A | 3/2000 |
| JP | 2002-351620 A | 12/2002 |
| JP | 2005-043971 A | 2/2005 |
| JP | 2006-113976 A | 4/2006 |

OTHER PUBLICATIONS

International Search Report mailed Aug. 28, 2007, for PCT Application No. PCT/JP2007/064404 filed Jul. 23, 2007, 2 pages.
Japanese Office Action mailed Mar. 1, 2013, for JP Application No. 2008-526752, 4 pages (including English translation).

\* cited by examiner

*Primary Examiner* — Diane Mizrahi
(74) *Attorney, Agent, or Firm* — Morrison & Foerster LLP

(57) ABSTRACT

A terminal device capable of displaying content is provided. The terminal device analyzes content data, which includes a plurality of display elements, and extracts one or more display elements satisfying a predetermined condition from the plurality of display elements. The terminal device associates each extracted display element with a corresponding display location information. The terminal device renders the extracted display elements in a predetermined display mode. The terminal device accepts a user selection of one of the extracted display elements, and displays the plurality of display elements, including display elements which are not displayed in the predetermined display mode, based on the display location information associated with the selected display element.

25 Claims, 6 Drawing Sheets

TERMINAL DEVICE, CONTENT DISPLAYING METHOD, AND CONTENT DISPLAYING PROGRAM

FIELD OF THE INVENTION

The present invention relates to a terminal device, a content displaying method, and a content displaying program that analyze content data and display content based on the interpreted result.

BACKGROUND OF THE ART

Recently, due to rapid popularization of networks represented by the Internet and its technology developments, a user has become able to browse information in the network using not only PCs (Personal Computers) such as a desktop PCs and laptop PCs but also various information terminals such as mobile phones, PDAs (Personal Digital Assistances), consumer electronics, and car navigation devices. The information browsing software (Hereinafter, "browser".) is installed in these information terminals. The browser parses a document described in a markup language described, for example, HTML (Hyper Text Markup Language), and then, performs a layout process based on the parsed result. Thereby, the information on the network (e.g., page) is displayed (i.e., rendered) on a display of the terminal.

First, the terms used in this application are defined.
Network:
The "network" includes various kinds of communications network including a carrier telecommunications network, an intranet, and the Internet.
Content:
The "content" is a set of information which the user views, including video, image, music or text, or their combinations, which is transmitted via a network or stored in a terminal.
Web Content:
The "web content" is a form of the content, and a set of information transmitted via a network.
Web Page (or Simply, "Page"):
The "web page" (or simply, "page") is a form of web content, and is whole content that is to be displayed when the user designated a particular URI (Uniform Resource Identifier). In other words, it means whole content that can be displayed by scrolling the image on the display. It is noted that a web page includes not only a page for browsing online but also a page for browsing offline. The web page for browsing offline includes, for example, pages transmitted via the Internet and cached by the browser, and pages saved in a "mht" format in places such as a local folder in a terminal device. The web page includes various kinds of data such as a HTML document, an image file, and voice data.

In accordance with the above definition, content encompasses web content, and web content encompasses a web page and a page.

The screen size of mobile terminals such as mobile phones is extremely small compared with, for example, desktop PCs. Therefore, the displaying size of a page is small, and its visibility is poor. Specially, when displaying, on a mobile terminal, pages created especially for, for example, desktop PCs, the poor visibility becomes more serious.

In such cases when the visibility of a page is poor, it may be difficult for the user to point exactly, for example, a desired anchor link included in the page. Also, a poor visibility of a page results in, for example, operation mistakes. Further, it results in an increase in a number of times needed for an operation.

For example, Japanese Patent provisional Publication No JP2002-351620A discloses technology created considering those problems. In accordance with JP2002-351620A, a page being displayed is divided into a plurality of areas. Then, when the user selects one of the areas, anchor links included in the area is extracted and displayed as a listed pop-up. By means of a simple operation that selects a desired anchor link among the lists, the user displays, for example, a topic of interest (i.e., link destination) on the screen.

DISCLOSURE OF THE INVENTION

However, in the terminal device described in JP2002-351620A, the visibility of a page is still poor eventually when the user selects an area. In other words, making a selection correctly of an area including a desired anchor link may be itself difficult for the user. In this aspect, in the terminal device described in JP2002-351620A, it may be difficult for the user to perform a pointing operation correctly to display a desired a portion in the page on the screen.

Accordingly, in view of the above circumstances, an object of the present invention is to provide a terminal device that is able to display a desired portion in the content on to the screen while achieving a correct pointing with a simple operation. Further, it is also an object of the invention to provide a content displaying method and a content displaying program for displaying a desired portion in the content on the screen while achieving a correct pointing with a simple operation.

A terminal device capable of displaying content, according to an aspect of the invention which addresses the above problems comprises: a content data analyzing means for analyzing content data; a data extracting means for extracting data satisfying a predetermined condition among the content data, based on the analyzed result; a location information associating means for associating, with each of the extracted data, corresponding location information in the content obtained as the analyzed result; a display element generating means for generating each of the associated extracted data as a selectable display element; a rendering means for rendering the generated display element and for displaying in a mode in which the display element is displayed; and a selecting means for selecting the rendered display element. When a certain display element is selected, the rendering means renders the content data so that the certain display element appears on a screen, and switches representation to a normal mode in which the content data is to be displayed originally, based on the location information associated with the certain display element.

In accordance with the terminal device so arranged, only particular data extracted with a predetermined condition is rendered and displayed on the screen as a selectable display element. Thereby, the user is able to perform the pointing operation correctly and easily, to display a desired portion in the content on the screen.

The data satisfying the predetermined condition is at least one of image data, text data defined in a bold font, text data defined in a style sheet, link data, and text data including a certain keyword.

Further, when displaying in the particular mode, the rendering means may put in a layout each of the display elements based on the associated location information. Moreover, the rendering means may perform a layout process based on the location information at least in a vertical direction.

The rendering means performs a layout making process based on the location information at least in a vertical direction in the screen.

A terminal device capable of displaying content according to another aspect of the invention, which addresses the above problems, comprises: a content data analyzing means for analyzing content data; a data detecting means for detecting data satisfying a predetermined condition among the content data, based on the analyzed result; a location information associating means for associating, with each of the detected data, corresponding location information in the content obtained from the analyzed result; a rendering means for rendering the content data based on the analyzed result such that a predetermined display element based on the detected data among the display elements obtained as the rendering result is rendered as a display element which is distinguishable from other display elements and is selectable, so that representation is made in a mode in which the display element which is distinguishable from other display elements and is selectable, is displayed; and a selecting means for selecting the predetermined display element. When a certain display element which is distinguishable from other display elements and which is selectable, is selected, based on the location information associated with the certain display element, the rendering means renders the content data so that the selected display element appears on the screen, and switches to a normal mode in which the content data is to be displayed originally.

According to the terminal device configured as above, data satisfying a certain condition is rendered to be distinguished from other data and to be a selectable display element. Therefore, the user is able to conduct a pointing operation correctly and easily while grasping an entire image of contents which is to be displayed originally, and to display a desired portion of the contents in the screen In the above described terminal device, the rendering means makes, for example, the predetermined display element based on the detected data distinguishable by rendering with a higher magnification ratio than that of other display element.

In the above described terminal device, for example, when the data satisfying the predetermined condition is text data with a font defined in a certain tag, the rendering means puts into a layout certain texts obtained based on the text data in a reduced area compared to the content, and does not display a character string which does not fit in the area while preserving the font size in the content.

A content displaying method for displaying content, according to an embodiment of the invention which addresses the above problems, comprises: a content data analyzing step for analyzing content data; a data extracting step for extracting data satisfying a predetermined condition among the content data, based on the analyzed result; a location information associating step for associating, with each of the extracted data, corresponding location information in the content which is acquired as a result of the analyzing; a display element generating step for generating each of the associated extracted data as a selectable display element; a first rendering step for rendering the generated display element and for making representation in a mode in which the display element is displayed; a selecting step for selecting the rendered display element; and a second rendering step for rendering, when a certain display element is selected, the content data so that the certain display element appears on a screen, based on the location information associated with the certain display element to switch representation to a normal mode in which the content data is to be displayed originally.

In accordance with such a content displaying method, only particular data extracted with the predetermined condition is rendered and displayed on the screen as a selectable display element. Thereby, the user is able to perform the pointing operation correctly and easily, to display a desired portion in the content on the screen.

In the first rendering step, each of the display elements may be put in a layout based on the associated location information.

Further, in the first rendering step, a layout process may be performed based on the location information at least in a vertical direction in the screen.

In the first rendering step, a same displaying magnification ratio for the rendering may be set for all of the extracted data.

In the first rendering step, the displaying magnification ratio may be set so that all of the display elements fit in one screen.

A content displaying method for displaying content, according to an embodiment of the invention which addresses the above problems, comprises: a content data analyzing step for analyzing content data; a data detecting step for detecting data satisfying a predetermined condition among the content data, based on the analyzed result; a location information associating step for associating, with each of the detected data, corresponding location information in the content obtained from the analyzed result; a rendering step for rendering the content data based on the analyzed result, such that a predetermined display element based on the detected data among the display elements obtained as the rendering result is rendered as a display element which is distinguishable from other display elements and is selectable, so that representation is made in a mode in which the display element which is distinguishable from other display elements and is selectable, is displayed; and a selecting step for selecting the predetermined display element. In the rendering step, when a certain display element which is distinguishable from other display elements and is selectable, is selected, based on the location information associated with the certain display element, the content data is rendered so that the selected display element appears on a screen, and representation is switched to a normal mode in which the content data is to be displayed originally.

In accordance with such a content displaying method, only particular data satisfying the predetermined is rendered so that it is distinguishable from other data and is selectable display element. Thereby, the user is able to perform the pointing operation correctly and easily, to display a desired portion in the content on the screen.

In the rendering step, for example, the predetermined display element based on the detected data is made distinguishable by rendering the predetermined element in a higher magnification ratio than other display elements.

Further, for example, when the data satisfying the predetermined condition is text data with font defined in a certain tag, in the rendering step, certain texts obtained based on the text data is put into a layout in a reduced area compared to the content, and character strings which do not fit in the area is not displayed while preserving the font size in the content.

A content displaying program, according to an aspect of the invention which addresses the above problems, may be a program for enabling a computer to execute the above described content displaying methods.

BRIEF DESCRIPTION OF ACCOMPANYING DRAWINGS

DETAILED DESCRIPTION OF PREFERRED EMBODIMENTS

Figure 1:
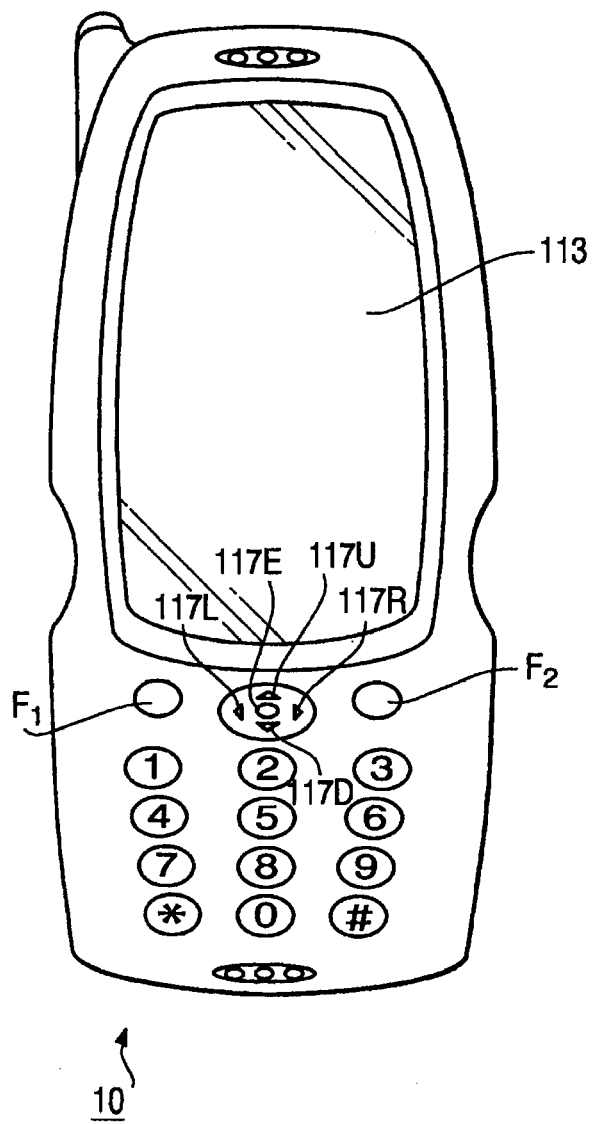
FIG. 1 is a diagram showing an exterior view of a terminal device according to an embodiment of the invention.

In the following, embodiments of the invention will be described referring to the drawings.

Figure 2:
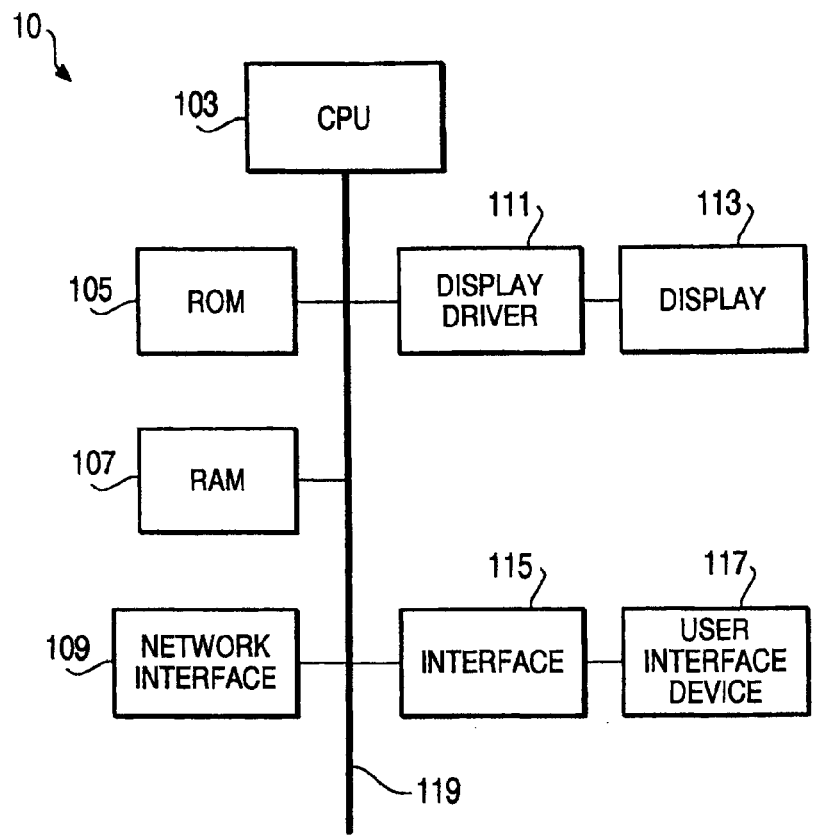
FIG. 2 is a block diagram showing an arrangement of a terminal device according to an embodiment of the invention.

FIG. 1 is a diagram showing an exterior view of a terminal device 10 according to an embodiment of the invention. FIG. 2 is a block diagram showing a configuration of the terminal device 10 according to an embodiment of the invention. In this embodiment, the terminal device 10 is a mobile phone, but in other embodiments, various kinds of forms can be assumed, for example, PCs such as desktop PCs and laptop PCs, mobile phones, PDAs, and PHS (Personal Handy phone System).

The terminal device 10 includes a CPU 103 that controls integrally thereof. The CPU 103 is connected to components via a bus 119. Those components include a ROM (Read-Only Memory) 105, a RAM (Random-Access Memory) 107, a network interface 109, a display driver 111, and an interface 115. The display driver 111 and the interface 115 are connected to a display 113 and a user interface device 117, respectively.

Various kinds of programs and data are stored in the ROM 105. The program stored in the ROM 105 is, for example, a browser 50. The browser 50 is information browsing software for browsing online or offline information described in predetermined markup languages.

The RAM 107 is an extracting destination for various kinds of programs stored in the ROM 105. According to the user operation using the user interface device 117 (Hereinafter, it is simply described as "user operation".), the program stored in the ROM 105 (e.g., the browser 50) is read and extracted to certain areas in the RAM 107, and then executed. Thereby, the browser 50 starts running.

The user interface device 117 includes a 5-way key and function keys F1, F2. The 5-way key includes four direction keys 117U, 117D, 117R, 117L and an enter key 117E.

In the following, functions of the browser 50 are described. A browser engine 30 which is a basic component of the browser 50 is described referring to FIG. 3.

Figure 3:
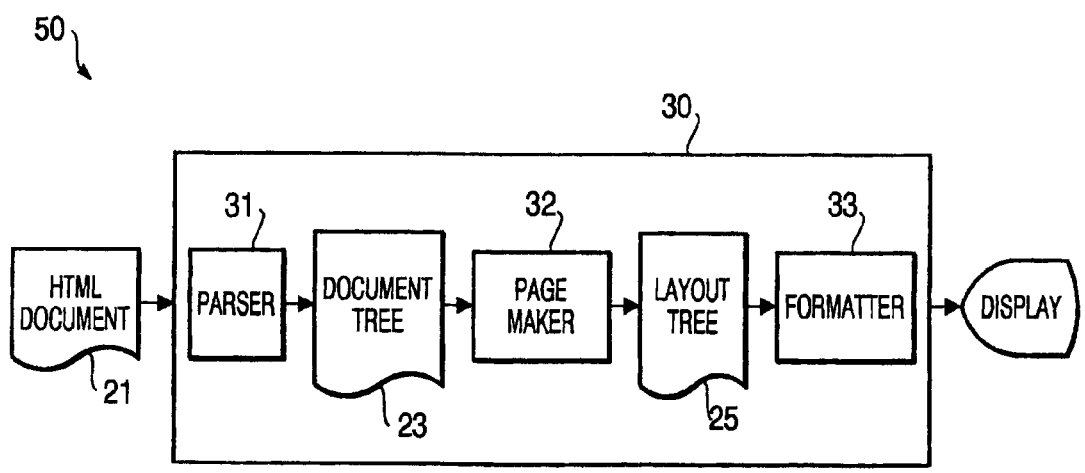
FIG. 3 is a functional block diagram of a browser engine included in a browser according to an embodiment of the invention.

FIG. 3 is a functional block diagram of the browser engine 30 included in the browser 50. As shown in FIG. 3, the browser engine 30 is provided with the functional blocks including a parser 31, a page maker 32, and a formatter 33.

Upon a URI is input via a user operation (or alternatively, when a URI is designated by selecting an anchor tag included in the web page, or when a URI that was held internally in the terminal device 10 as a bookmark or a history log, is selected), the browser 50 operates to acquire a HTML document 21 (i.e., the requested page) from a URI (e.g., a server) in the Internet.

The server sends out a HTML document 21 in response to the request made by the browser 50. The sent out HTML document 21 is then, passed to the parser 31 via a certain network and a network interface 109.

The parser 31 parses this HTML document 21, and creates a document tree 23 that shows the syntax structure of the HTML document 21 in a tree structure. It is noted that the document tree 23 only shows the syntax structure of the HTML document 21 and does not include information related to expressions in the document.

Then, the page maker 32 creates a layout tree 25 including expression formats, for example, "block", "inline", "table", "list" and "item", in the HTML document 21, based on information associated with the document tree 23 and the tags. In other words, the layout tree 25 includes information related to an ordering of, for example, "block", "inline", and "table". The layout tree 25 does not include information regarding positions in the screen and size corresponding to their elements (e.g., "block", "inline", and "table").

The formatter 33 executes a well-known formatting based on information of the layout tree 25 and the specification of the mobile device 10, and makes a layout for each element (e.g., text and image) in the screen of the display 113. Following the above process carried out by the parser 31, the page maker 32 and the formatter 33, the HTML document 21, i.e., the requested page, is displayed on the display 113.

It is noted that each of, for example, the text and image, displayed in a layout in the screen of the display 113 by means of a rendering process carried out by the browser engine 30, may be expressed as an "element".

Figure 4:
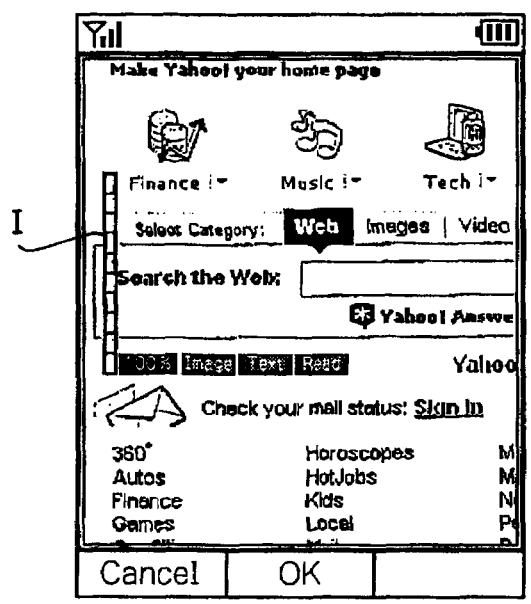
FIG. 4 is a diagram showing an example of a page displayed in a browser according to an embodiment of the invention.

FIG. 4 shows an example of a page displayed by the browser 50. This page is created for displays of, for example, desktop PCs (e.g., XGA (eXtended Graphics Array)). In contrast, the display 113 is of, for example, QVGA (Quarter Video Graphics Array). In this embodiment of the invention, the formatter 33 has not performed a formatting which is for adjusting to the number of pixels of the display 113 (e.g., folding of texts adjusting to the number of pixels in the screen width). Therefore, as shown in FIG. 4, the page is not fit in the displaying area in the display 113 and only a part of the page is displayed.

When a certain user operation is performed after a page is displayed in the browser 50, as shown in FIG. 4, the browser 50 displays an indicator I in front of the page. Also, simultaneously, the buttons in the center of lower portion and left of lower portion in the screen is captioned "OK.", "Cancel".

When the enter key 117E is pressed, the button in the center of lower portion ("OK." in FIG. 4) is selected and a corresponding process is executed. Further, when the function key F1 is pressed, the button in the left of lower portion in the screen ("Cancel" in FIG. 4) is selected and a corresponding process is executed. When the function key F2 is pressed, the button in the lower end right in the screen is selected and a corresponding process will be executed.

The indicator I is formed of a plurality of icons lined up in a longitudinal row and a lateral row. As shown in FIG. 4, initially, the lowermost icon in the indicator I is displayed in a different color compared to other icons. In other words, the lowermost icon is in a "state of drawing attention". By means of pressing direction keys 117U or 117D, the user is enabled to change the longitudinal icon which is in a "state of drawing attention".

As shown in FIG. 4, at the side of the longitudinal icon in a "state of drawing attention" (right side of the indicator I), icons, "100%", "Image", "Text", and "Read", are lined up in a row. Initially, "100%" icon is in a "state of drawing attention" among these icons. The "100%" icon is an icon for determining a page displaying magnification ratio. If the enter key 117E is pressed (i.e., when the "OK" button is selected) when the "100%" icon is in a "state of drawing attention", the browser 50 displays the page in an unchanged magnification ratio. It is noted that the browser 50 displays the page in an unchanged magnification ratio initially. Therefore, even if the user presses the enter key 117E right after the indicator I was displayed, the page displaying magnification ratio does not change. If the user presses the function key F1 (i.e., when the "Cancel" button was selected), the browser 50 clears the indicator I.

By means of pressing a direction key 117R or 117L, the user is able to change the lateral icon which is to be in a "state of drawing attention". When the icon was changed with such an operation, the browser 50 displays the page in a mode corresponding to the icon in a state of drawing attention (e.g., "Image", "Text", and "Read" icons).

Figure 7:
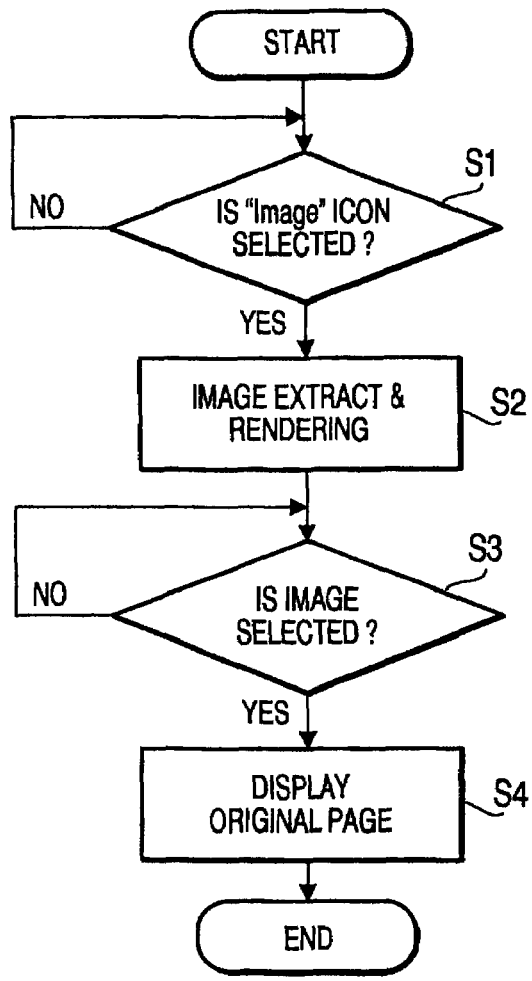
FIG. 7 is a. flowchart showing a page displaying process in the "Image Jump mode" according to an embodiment of the invention.

For example, when the operation is conducted so that the "Image" icon draws attention, the browser 50 changes the page displaying mode to an "Image Jump mode". FIGS. 5(a)-(d) show an example of the pages displayed in an "Image Jump mode". Also, FIG. 7 shows a flowchart of a page displaying process in an "Image Jump mode". In the following, the "Image Jump mode" is described.

The "Image Jump mode" is a mode that extracts and displays only the images that are included in the page which is naturally displayed by a normal analyzed result and which had been displayed a while ago (Hereinafter, it is described as "original page". Further, the mode displaying the original page is hereinafter referred to as "normal mode" for the purpose of description.). Specifically, when the "Image" icon is selected (Step 1: YES. Hereinafter, "Step" is abbreviated as "S" in the Description and the Figures.), at first, the browser 50 clears the original page display. At this time, the file for each of the images is in a condition cached in the memory (e.g., RAM 107). Then, the browser 50 (formatter 33) renders each of the cached images to be allocated in a condition in which the correlations in the original page is preserved, based on each image information included in the HTML document of the original page (e.g., the image filename, "width", "height", "align" attributes used in the definition in "image", and information regarding the location which the image is to be laid out in the original page) and information related to the screen size of the display 113 (S2). Thereby, at the screen of the display 113, the page in which only the images from the original page are extracted and allocated (hereinafter, "image index page") is displayed. In other words, the displaying form on the display 113 switches from the "normal mode" (or depending on the situation, the below described "Title Jump mode") to the "Image Jump mode". It is noted that, in the "Image Jump mode", the browser 50 recognizes the relationships between each of the images and each of the image information (It holds those relationship information in, for example, RAM 107.). Each image is generated and rendered as the display data which is selectable by the 5-way key (i.e., the image which is able to put the focus on).

In the image index page, each of the images is allocated in a condition with a changed magnification ratio using the same reduction rate. This means that the relative size among the images in the original page is also preserved in the "Image Jump mode". The reduction rates then is preferably, in a degree in which all of the images are put inside one screen (an area displayable in the display 113 at a time).

Also, each of the images in the image index page, may be allocated in an unchanged magnification ratio or in a condition with changed magnification ratio using a same magnifying rate. The relative size among the images is also preserved in these cases.

In the image index page, each of the images is allocated so that the layout is preserved with respect to the up and down longitudinal directions in the screen. It is noted that the image allocated in an upper portion in the original page will be allocated in the upper portion also in the image index page. Further, the image allocated in the lower portion in the original page will be allocated in the lower portion also in the image index page.

Figure 5:
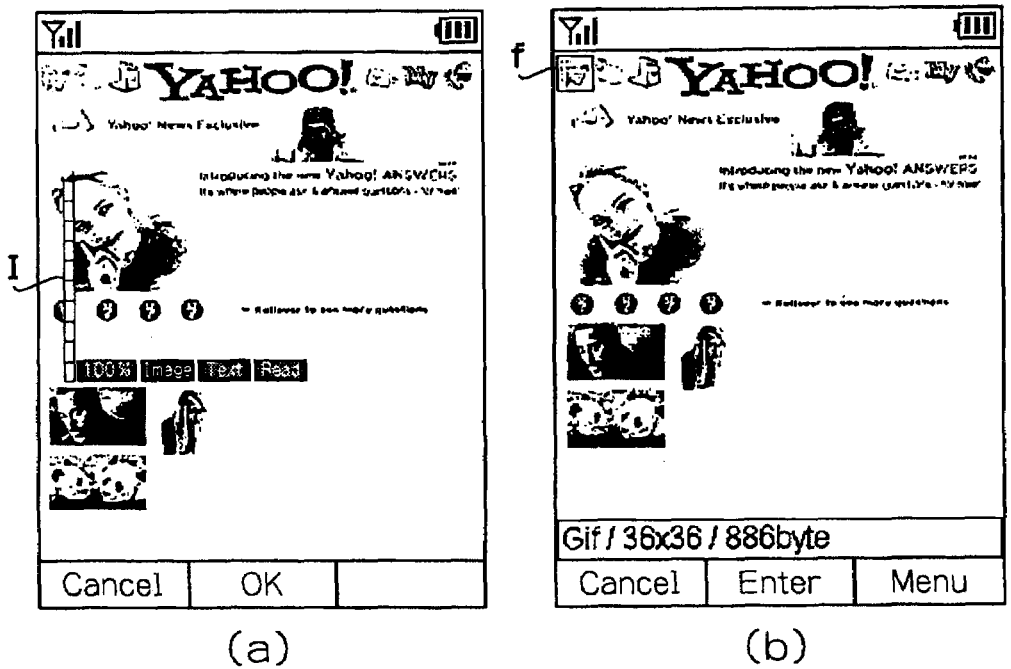
FIG. 5 is a diagram showing an example of a page displayed in the "Image Jump mode" according to an embodiment of the invention.
Figure 5:
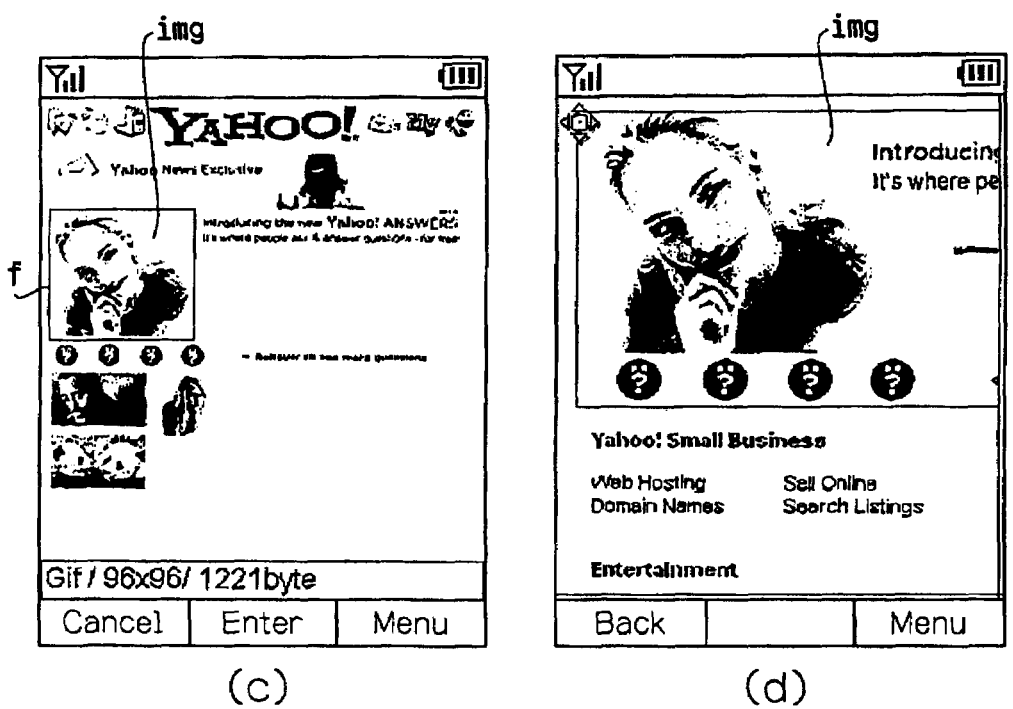

When the enter key 117E is pressed in FIG. 5(a), as shown in FIG. 5(b), the browser 50 clears the indicator I, and sets the focus f to the image allocated in the uppermost row in the image index page. It is noted that when there are a plurality of images allocated in the uppermost row, the browser 50 sets the focus f to the image allocated most left among them. It has become possible that the user sets the focus f to a desired image by means of a user operation using each of the direction keys.

FIG. 5(c) shows a condition where a focus f is set to an image (img) in which a person appears in the image index page. Then, if the enter key 117E is pressed, the browser 50 determines "YES" at the S3 process in FIG. 7 considering that the image (img) is selected, and compares the image information associated with the image (img) and the HTML document of the original page. Then, based on the result of the comparison and information corresponding to the layout tree of the original page and the screen size of the display 113, the original page is displayed on the screen of the display 113 (S4). In other words, the displaying form on the display 113 is switched from the "Image Jump mode" to the "normal mode". Specifically, as shown in FIG. 5(d), at this time, the original page is displayed at a position where the image (img) appears in the screen of the display 113. That is, in the "Image Jump mode", it can be said that each of the images is rendered as a link of a position where the image should be displayed in the original page. Also, when displaying the original page in the above example, the browser 50 may display the original page in a condition in which the focus is being set to the image (img).

According to the "Image Jump mode" of the embodiment, only images included in the original page are extracted and displayed in the screen on the display 113. Since the displaying object is only the images, the browser 50 is able to display all the images included in the page in one screen (or a few screens) in a relatively large size. In other words, the browser is able to display each of the images with good visibility. These images are associated with information of the locations where those images should be displayed in the original page. The user selects a desired image among these images with good visibility so as to display, for example, a portion of interest in the page in the screen of the display 113. That is, it becomes possible that the user performs pointing operations correctly and easily to browse pages. Also, it becomes possible that the user browses a desired portion in the page correctly and easily without scrolling the screen much.

Further, in the image index page according to the embodiment of the invention, each of the images is displayed in a condition in which correlations in the original page are preserved. Therefore, if the user recognizes the total image of the original page visually and intuitively, the user can find out a desired image more easily in the image index page.

In the following, a process when the "Text" icon is drawn attention is described. When the operation is conducted so that the "Text" icon is drawn attention, the browser 50 changes the page displaying mode to the "Title Jump mode". In FIGS. 6(a)-(d), an example of pages displayed in the "Title Jump mode" is shown.

The "Title Jump mode" is a mode that extracts and displays only texts which are likely to be titles (hereinafter, "title texts".) in the original page. Specifically, when the "Text" icon is selected, the browser 50 clears the display of the original page first. Then, the browser 50 searches the HTML document of the original page and acquires the title text. In this stage, the browser 50 recognizes the relationship between each of the acquired title texts and corresponding location information (i.e., information of the portion that is to be displayed in the original page) (For example, the browser 50 holds the relationship information in the RAM 107.).

In the following, the title text is described. The title text includes, for example, the texts with bold font (specified with <b>, <strong>, <h1>, . . . <h6> in the HTML document), the texts defined in style sheets such as CSS (Cascading Style Sheets) (e.g., displayed with emphasis in the CSS (BOLD), and the texts defined a font size (character size)), the anchor texts, and the texts including certain keywords.

Following the acquisition of the title texts, based on the information related to each of the above described location information and the screen size of the display 113 for each of the title texts, the browser 50 renders so that each of the title texts is allocated in a condition in which correlations of the original page are preserved. Thereby, in the screen of the display 113, the page in which only the title texts are extracted from the original page and are allocated (Hereinafter, "title index page".), is displayed. In other words, the displaying form in the display 113 is switched from the "normal mode" (or according to the situation, the "Image Jump mode") to the title index page. These title texts are also generated and rendered as the display data which can be selected by the 5-way key (i.e., the text which can be set focus on).

In the title index page, each of the title texts is displayed, for example, in a condition in which original font size is preserved, or in a unified font size. Alternatively, each of the title texts is displayed in a condition with a changed magnification ratio using a same reduction ratio (or a magnification ratio).

Also, in the title index page, each of the title texts is allocated so that the layout is preserved with respect to up and down directions and left and right directions in the screen. Further, the title texts allocated in an upper part and a lower part in the original page are also allocated in the same upper part and the lower part in the title index page, respectively. The title texts allocated in a right part and a left part in the original page are also allocated in the same right part and the left part in the title index page, respectively.

Figure 6:
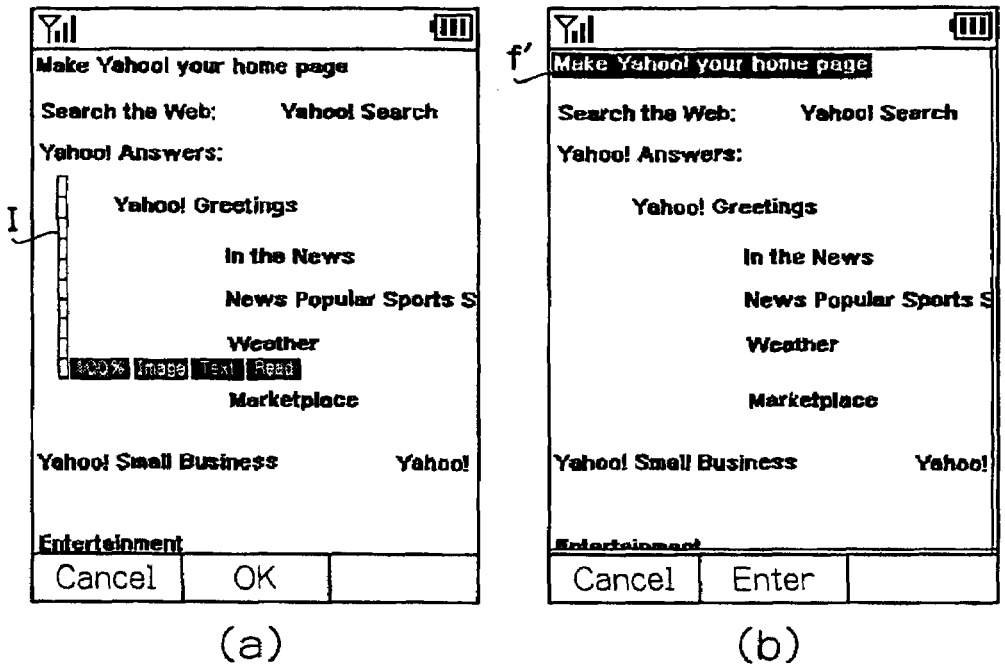
FIG. 6 is a diagram showing an example of a page displayed in the "Title Jump mode" according to an embodiment of the invention.
Figure 6:
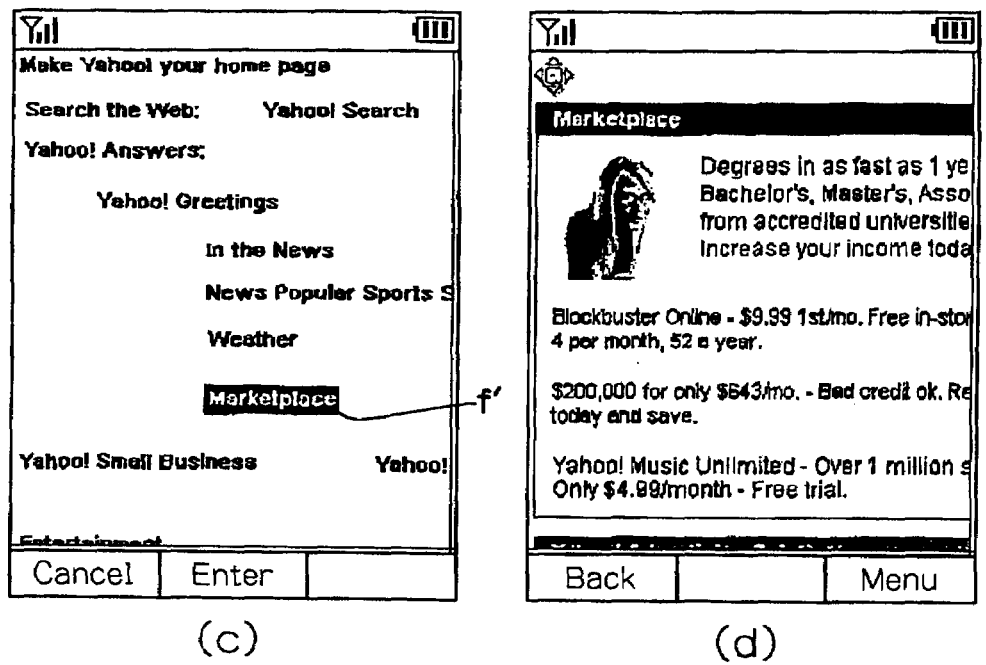

When the enter key 117E is pressed in FIG. 6(a), as shown in FIG. 6(b), the browser 50 clears the indicator I and sets the focus f on the title texts allocated in an uppermost row in the title index page. If there is a plurality of title texts allocated in the upper most row, the browser 50 sets the focus f on the title text allocated at the most left among them. The user is able to set the focus f on a desired title texts by means of a user operation using each of the direction keys.

FIG. 6(c) shows a condition in which the focus f is set on a title text captioned "Marketplace" in the title index page. Then, when the enter key 117E is pressed, the browser 50 compares the above described location information associated with the "Marketplace" title text and the HTML document of the original page. Then, based on the result of the comparison and the information related to the layout tree of the original page and the screen size of the display 113, the browser 50 displays the original page in the screen of the display 113. In other words, the browser 50 switches the displaying form on the display 113 from the "normal mode" to the "Title Jump mode". Specifically, at this time, as shown in FIG. 6(d), the original page is displayed so that the "Marketplace" title text appears in the upper part in the screen of the display 113. Thus, it can be said that in the "Title Jump mode", each of the title texts is rendered as a link to a location where the title text is to be displayed in the original page.

In accordance with the "Title Jump mode" of the embodiment, only the title texts included in the original page are extracted and displayed on the screen of the display 113. Since the displaying object is only the title texts, the browser 50 is able to display all the title texts included in the page in a relatively large size inside one screen (or few screens). That is, the browser is able to display each of the title texts with good visibility. Further, these title texts are associated with information of locations where the title texts are to be displayed in the original page. The user is able to select a desired title text among these title texts with good visibility, to display in the screen of the display 113, for example, an interesting item in the page. In other words, the user is able to browse a page performing pointing operations correctly and easily. Also, the user is able to browse a desired portion in the page correctly and easily without scrolling the screen much.

In the title index page according to the embodiment, each of the title texts is displayed in a condition in which the correlations in the original page are preserved. Therefore, when the user recognizes the whole image of the original page visually and intuitively, the user is able to find desired title texts in the title index page more easily.

The embodiments of the invention are described in the above. However, the present invention is not to be limited to those embodiments and various modifications are possible.

For example, as another embodiment of the "Image Jump mode", in the image index page, the browser may display other elements also (e.g., texts) in addition to images. In this case, the browser 50 displays images and elements other than images, with a displaying magnification ratio of the elements other than images to the original page lower than a displaying magnification ratio of the images to the original page, in the screen of the display 113. Specifically, for example, the text, etc., may be displayed in a 50% magnification ratio while each of the images is displayed in a 70% magnification ratio.

That is, according to the another embodiment of the invention, in the "Image Jump mode", each of the images is displayed relatively larger than other elements comparing with those displayed in the original page. Therefore, the visibility of each of the images is maintained good. Thereby, the user is able to perform the pointing operation to each of the images correctly and easily. Since the text, etc., are displayed small, the number of images to be displayed in one screen increases. Therefore, by means of selecting one of the images without scrolling the screen much, the user is able to browse a desired portion in the page correctly with an easy operation, as with the above described embodiment. Also, since the text, etc., are displayed, the layout of the image index page is displayed in a closer condition than the layout in the original page. Therefore, when the user recognizes the whole image of the original page visually and intuitively, the user is able to find a desired portion of the page more easily in the image index page.

The another embodiment of the "Image Jump mode" is described but, for example, an embodiment replacing the "Image Jump mode" with the "Title Jump mode", is also possible. That is, according to this embodiment, in the title index page, each of the title texts is displayed relatively larger than other elements (e.g., texts (other than title texts) and images) compared with those in the original page. In this case, by means of selecting one of the title texts, it is also possible to browse a desired portion in the page correctly with simple operations, as with the above described embodiment.

The following form can be raised as a displaying form in which the visibility of the title text is put more priority on in the title index page. Specifically, for example, the title texts themselves are displayed in an unchanged magnification ratio with the displaying area of each of the title texts in a 70% size, and also other texts and images, etc., are displayed in a 50% magnification ratio. The displaying area of 70% herein means that the displaying area of the title texts in the title index page is to be 70% size of the displaying area of the same title texts in the original page. Since the displaying area for each of the title texts is narrower and the font size of the title texts itself is same as in the original page, a character string in a title text, which do not fit in the 70% displaying area (e.g., the latter part of the string), is not displayed, and typically the forefront portion in the title text is displayed, for example. In this embodiment, by means of displaying each of the title texts in a narrow area, the browser is enabled to obtain the displaying area of the other texts and images, etc., and to achieve simultaneously good visibility by means of displaying the title texts in an unchanged magnification ratio. Therefore, the user is able to grasp the entire image of the page more intuitively, and to point the title texts correctly with a simple operation and with good visibility maintained.

Furthermore, in a yet another embodiment, the browser may display a page in a hybrid mode that combines the "Image Jump mode" and the "Title Jump mode". In this mode, the browser 50 displays a page in which only each of the title texts and the images are extracted. In this case, both the title texts and the images become the selectable elements by the user operation (objects to sets the focus on).

In a yet another embodiment, the browser may display each of the title texts and the images so that they are relatively larger than other elements (e.g., texts other than title texts) compared with those in the original page.

In a yet another embodiment, when the images and the title texts are displayed relatively larger than other elements, the browser may process so that only those images and the title texts are to be made as the selectable elements with the user operation. That is, in this case, the process is executed so that a focus will not be set on to those other elements.

In a yet another embodiment, with respect to the texts displayed relatively smaller than the images and the title texts, they may be displayed in predetermined character strings such as " . . . " and " " (i.e., representation that can enable the user to visually recognize at least existence of texts). With respect to the title texts, they are displayed with correct character strings. By displaying texts of other elements with the predetermined character strings, it becomes possible to maintain the layout with closer condition to the original page, and to lessen the time needed for the displaying process for the title index page.

In accordance with the invention, a terminal device that is able to display a desired portion in the content on the screen achieving a correct pointing with easy operation is provided. Also, a content displaying method and a content displaying program that are suitable for displaying in the screen a desired portion in the content with a collect pointing with easy operation advantageously are provided.

Also, for example, when displaying search results by search engines, the "Image Jump mode" and the "Title Jump mode" according to the embodiments are quite advantageous. For example, when performing an image search in a search engine, a set of, for example, images, a URI and a summary, is displayed as the search result for each of the contents. For example, when the "Image Jump mode" is executed in such a search result screen, the search result for each of the contents may be limited to only images. As a result, more search results are displayed in one screen. Thereby, it is possible to present more search results to the user at a time, and it is particularly advantageous for the user in appliances with limited screen size such as mobile phones. Also, when the "Title Jump mode" is executed, it is possible to display the search result for each of the contents limiting to the title texts (i.e., particular character strings). In this case, same advantages as in the example relating to the "Image Jump mode", and it brings a huge benefit to the user can be provided.

What is claimed is:

1. A terminal device capable of displaying content, comprising:
   a content data analyzing unit configured to analyze content data received via a network, the content data including a plurality of display elements to be displayed;
   a data extracting unit configured to extract one or more display elements satisfying a predetermined condition among the plurality of display elements in the content data, based on the analyzed result;
   a location information associating unit configured to associate each extracted display element with a corresponding display location information based on the analyzed result;
   a rendering unit configured to render the extracted display elements and display the extracted display elements in a predetermined display mode; and
   a selecting unit configured to accept a user selection of one of the display elements displayed in the predetermined display mode,
   wherein when the one of the display elements is selected, the rendering unit displays the plurality of display elements, including display elements which are not displayed in the predetermined display mode, based on the display location information associated with the selected display element.

2. The terminal device according to claim 1, wherein the one or more display elements satisfying the predetermined condition include at least one of image data, text data defined in a bold font, text data defined in a style sheet, link data, and text data including a certain keyword.

3. The terminal device according to claim 1, wherein when displaying in the predetermined mode, the rendering unit puts in a layout each extracted display element based on the associated display location information.

4. The terminal device according to claim 3, wherein the rendering unit performs a layout process based on the display location information at least in a vertical direction in the screen.

5. The terminal device according to claim 1, wherein the rendering unit sets a same displaying magnification ratio for rendering, for each extracted display element.

6. The terminal device according to claim 5, wherein the rendering unit sets the displaying magnification ratio so that all of the extracted display elements fit in one screen.

7. A terminal device capable of displaying content, comprising:
   a content data analyzing unit configured to analyze content data received via a network, the content data including a plurality of display elements to be displayed;
   a data detecting unit configured to detect one or more display elements satisfying a predetermined condition among the plurality of display elements in the content data, based on the analyzed result;

a location information associating unit configured to associate each detected display element with a corresponding display location information based on the analyzed result;

a rendering unit configured to render the content data based on the analyzed result such that a predetermined display element is rendered as a display element which is distinguishable from other display elements and is selectable; and a selecting unit configured to accept a user selection of one of the detected display elements, wherein when the one of the detected display elements which is distinguishable from other display elements and which is selectable, is selected, based on the display location information associated with the selected display element, the rendering unit displays the plurality of display elements, including display elements of the plurality of display elements which are not displayed in the predetermined display mode.

8. The terminal device according to claim 7, wherein the rendering unit makes the predetermined display elements distinguishable by rendering the predetermined display elements in a higher magnification ratio than that of other display elements.

9. The terminal device according to claim 7, wherein when the one or more display elements satisfying the predetermined condition are text data with a font defined in a certain tag, wherein the rendering unit puts into a layout certain texts obtained based on the text data in a reduced area compared to the content, and does not display a character string which does not fit in the area while preserving the font size in the content.

10. A computer-implemented content displaying method for displaying content, comprising:

a content data analyzing step of analyzing content data received via a network, the content data including a plurality of display elements to be displayed;

a data extracting step of extracting one or more display elements satisfying a predetermined condition among the plurality of display elements in the content data, based on the analyzed result;

a location information associating step of associating each extracted display element with a corresponding display location information based on a result of the analyzing;

a first rendering step of rendering the extracted display elements and for displaying the extracted display elements in a predetermined display mode;

a selecting step of accepting a user selection of one of the display elements; and a second rendering step of rendering, when the one of the display elements is selected, the content data so that the plurality of display elements is displayed, including display elements of the plurality of display elements which are not displayed in the predetermined display mode, based on the display location information associated with the selected display element.

11. The computer-implemented content displaying method according to claim 10, wherein in the first rendering step, each extracted display element is put in a layout based on the associated display location information.

12. The computer-implemented content displaying method according to claim 11, wherein in the first rendering step, a layout process is performed based on the display location information at least in a vertical direction in the screen.

13. The computer-implemented content displaying method according to claim 10, wherein in the first rendering step, a same displaying magnification ratio for the rendering is set for all of the extracted display elements.

14. The computer-implemented content displaying method according to claim 13, wherein in the first rendering step, the displaying magnification ratio is set so that all of the extracted display elements fit in one screen.

15. A computer-implemented content displaying method for displaying content, comprising:

a content data analyzing step of analyzing content data received via a network, the content data including a plurality of display elements to be displayed;

a data detecting step of detecting one or more display elements satisfying a predetermined condition among the plurality of display elements in the content data, based on the analyzed result;

a location information associating step of associating each detected display element with a corresponding display location information based on the analyzed result;

a rendering step of rendering the content data based on the analyzed result, such that a predetermined display element is rendered as a display element which is distinguishable from other display elements and is selectable; and a selecting step of accepting a user selection of one of the detected display elements, wherein, in the rendering step, when the one of the display elements which is distinguishable from other display elements and is selectable, is selected, based on the display location information associated with the selected display element, the plurality of display elements, including display elements of the plurality of display elements which are not displayed in the predetermined display mode is displayed.

16. The computer-implemented content displaying method according to claim 15, wherein in the rendering step, the predetermined display elements are made distinguishable by rendering the predetermined display elements in a higher magnification ratio than other display elements.

17. The computer-implemented content displaying method according to claim 15, wherein when the one or more display elements satisfying the predetermined condition are text data with font defined in a certain tag, wherein in the rendering step, certain texts obtained based on the text data is put into a layout in a reduced area compared to the content, and character strings which do not fit in the area is not displayed while preserving the font size in the content.

18. A computer readable medium having computer readable instruction stored thereon, which, when executed by a processor of a computer, configures the processor to perform:

a content data analyzing step of analyzing content data received via a network, the content data including a plurality of display elements to be displayed;

a data extracting step of extracting one or more display elements satisfying a predetermined condition among the plurality of display elements in the content data, based on the analyzed result;

a location information associating step of associating each extracted display element with a corresponding display location information based on a result of the analyzing;

a first rendering step of rendering the extracted display elements and for displaying the extracted display elements in a predetermined display mode;

a selecting step of accepting a user selection of one of the display elements; and a second rendering step of rendering, when the one of the display elements is selected, the content data so that the plurality of display elements is displayed, including display elements of the plurality of display elements which are not displayed in the predetermined display mode, based on the display location information associated with the selected display element.

19. The computer readable medium according to claim 18, wherein in the first rendering step, each of the extracted display elements is put in a layout based on the associated display location information.

20. The computer readable medium according to claim 19, wherein in the first rendering step, a layout process is performed based on the display location information at least in a vertical direction in the screen.

21. The computer readable medium according to claim 18, wherein in the first rendering step, a same displaying magnification ratio for the rendering is set for all of the extracted display elements.

22. The computer readable medium content displaying method according to claim 21, wherein in the first rendering step, the displaying magnification ratio is set so that all of the extracted display elements fit in one screen.

23. A computer readable medium having computer readable instruction stored thereon, which, when executed by a processor of a computer, configures the processor to perform:
 a content data analyzing step of analyzing content data received via a network, the content data including a plurality of display elements to be displayed;
 a data detecting step of detecting one or more display elements satisfying a predetermined condition among the plurality of display elements in the content data, based on the analyzed result;
 a location information associating step of associating each detected display element with a corresponding display location information based on the analyzed result;
 a rendering step of rendering the content data based on the analyzed result, such that a predetermined display element is rendered as a display element which is distinguishable from other display elements and is selectable; and
 a selecting step of accepting a user selection of one of the detected display elements,
 wherein, in the rendering step, when the one of the display elements which is distinguishable from other display elements and is selectable, is selected, based on the location information associated with the selected display element, the content data is rendered so that the plurality of display elements, including display elements of the plurality of display elements which are not displayed in the predetermined display mode, is displayed.

24. The computer readable medium according to claim 23, wherein in the rendering step, the predetermined display elements are made distinguishable by rendering the predetermined display elements in a higher magnification ratio than other display elements.

25. The computer readable medium according to claim 23, wherein when the one or more display elements satisfying the predetermined condition are text data with font defined in a certain tag, wherein in the rendering step, certain texts obtained based on the text data is put into a layout in a reduced area compared to the content, and character strings which do not fit in the area is not displayed while preserving the font size in the content.

* * * * *